(12) United States Patent
Nakamura (10) Patent No.: US 7,489,352 B2
(45) Date of Patent: Feb. 10, 2009

(54) WIDE DYNAMIC RANGE PINNED PHOTODIODE ACTIVE PIXEL SENSOR (APS)

(75) Inventor: Junichi Nakamura, Tokyo (JP)

(73) Assignee: Micron Technology, Inc., Boise, ID (US)

(*) Notice: Subject to any disclaimer, the term of this patent is extended or adjusted under 35 U.S.C. 154(b) by 933 days.

(21) Appl. No.: 10/294,686

(22) Filed: Nov. 15, 2002

(65) Prior Publication Data

US 2004/0096124 A1 May 20, 2004

(51) Int. Cl.
*H04N 5/335* (2006.01)

(52) U.S. Cl. .............. 348/296; 348/216.1; 348/239; 348/308; 348/315

(58) Field of Classification Search ........... 348/254, 348/296, 308, 216.1, 222.1, 239, 241, 275, 348/315; 257/291, 292
See application file for complete search history.

(56) References Cited

U.S. PATENT DOCUMENTS

| | | | | |
|---|---|---|---|---|
| 5,714,753 | A * | 2/1998 | Park ..................... | 250/208.1 |
| 6,008,486 | A | 12/1999 | Stam et al. | |
| 6,107,655 | A * | 8/2000 | Guidash ................. | 257/233 |
| 6,115,065 | A | 9/2000 | Yadid-Pecht et al. | |
| 6,160,281 | A | 12/2000 | Guidash | |
| 6,166,768 | A | 12/2000 | Fossumm et al. | |
| 6,211,915 | B1 * | 4/2001 | Harada ................... | 348/298 |
| 6,218,656 | B1 | 4/2001 | Guidash | |
| 6,218,691 | B1 * | 4/2001 | Chung et al. ............. | 257/290 |
| 6,239,456 | B1 | 5/2001 | Berezin et al. | |
| 6,246,043 | B1 | 6/2001 | Merrill | |
| 6,344,877 | B1 * | 2/2002 | Gowda et al. ............. | 348/245 |
| 6,352,869 | B1 | 3/2002 | Guidash | |
| 6,407,440 | B1 | 6/2002 | Rhodes | |
| 6,423,994 | B1 | 7/2002 | Guidash | |
| 6,552,323 | B2 | 4/2003 | Guidash et al. | |
| 6,606,121 | B1 * | 8/2003 | Bohm et al. ............. | 348/297 |
| 6,657,665 | B1 | 12/2003 | Guidash | |
| 6,665,010 | B1 * | 12/2003 | Morris et al. ............. | 348/297 |
| 6,809,768 | B1 * | 10/2004 | Merrill ................... | 348/308 |
| 6,831,692 | B1 * | 12/2004 | Oda ....................... | 348/315 |
| 6,972,794 | B1 * | 12/2005 | Wang et al. .............. | 348/302 |
| 7,088,388 | B2 * | 8/2006 | MacLean et al. .......... | 348/234 |
| 7,154,546 | B1 * | 12/2006 | Cho ....................... | 348/272 |
| 2002/0085105 | A1 | 7/2002 | Sohn | |

(Continued)

OTHER PUBLICATIONS

Analysis of Temporal Noise in CMOS Photodiode Active Pixel Sensor, Hui Tian, et al., IEEE Journal of Solid-State Circuits, vol. 36, No. 1, Jan. 2001.

(Continued)

*Primary Examiner*—Lin Ye
*Assistant Examiner*—Chriss S Yoder, III
(74) *Attorney, Agent, or Firm*—Dickstein Shapiro LLP (57) ABSTRACT

An image apparatus and method is disclosed for extending the dynamic range of an image sensor. A first linear pixel circuit produces a first pixel output signal based on charge integration by a first photo-conversion device over a first integration period. A second linear pixel circuit produces a second pixel output signal based on charge integration by a second photo-conversion device over a second integration period, where the second integration period is shorter than the first integration period. A sample-and-hold circuit captures signals representing the first and second pixel output signals.

19 Claims, 5 Drawing Sheets

U.S. PATENT DOCUMENTS

2002/0090748 A1 7/2002 Lee et al.
2002/0096733 A1 7/2002 Rhodes
2002/0105012 A1 8/2002 Hua
2002/0113887 A1 8/2002 Iimura et al
2002/0140832 A1* 10/2002 Summa .................. 348/273

OTHER PUBLICATIONS

A High Dynamic Range CMOS APS Image Sensor, Y. Wang, et al., 2001 IEEE Workshop, Jun. 7-9, 2001.

* cited by examiner

WIDE DYNAMIC RANGE PINNED PHOTODIODE ACTIVE PIXEL SENSOR (APS)

FIELD OF THE INVENTION

The present invention relates to the pixel structure used in a CMOS active pixel array.

BACKGROUND OF THE INVENTION

The dynamic range (DR) for an image sensor is commonly defined as the ratio of the largest nonsaturating signal to the standard deviation of noise under dark conditions. The quality of an image sensor is largely defined by its dynamic range—as it increases, the sensor can detect a wider range of illuminations and consequently produce images of greater detail and quality.

Several pixel architectures have been developed in an effort to produce good dynamic range. However, conventional pixel architectures are subject to one or more of the drawbacks of high photodiode dark current, thermal (kTC) noise, fixed light sensitivity ratio and charge leakage. Moreover, when logarithmic architectures are used to increase dynamic range, a more complicated color pixel processing is required.

BRIEF SUMMARY OF THE INVENTION

The present invention provides a pixel architecture which seeks to mitigate many of the noted drawbacks and employs a dual pixel pinned photodiode architecture operating in a dual charge integration. The two pixels enable a dual sensitivity pixel array in which one pixel functions to reproduce normal images, while the other pixel functions to reproduce images with high illumination levels. The dual charge integration mode and dual sensitivity, in combination, produce a pixel architecture having good dynamic range without having to resort to a logarithmic pixel architecture.

Various dual pixel, dual integration mode embodiments are provided together with associated operating methods. These and other features and advantages of the invention will be more closely described from the following detailed description provided in connection with the accompanying drawings.

DETAILED DESCRIPTION OF THE INVENTION

Figure 1:
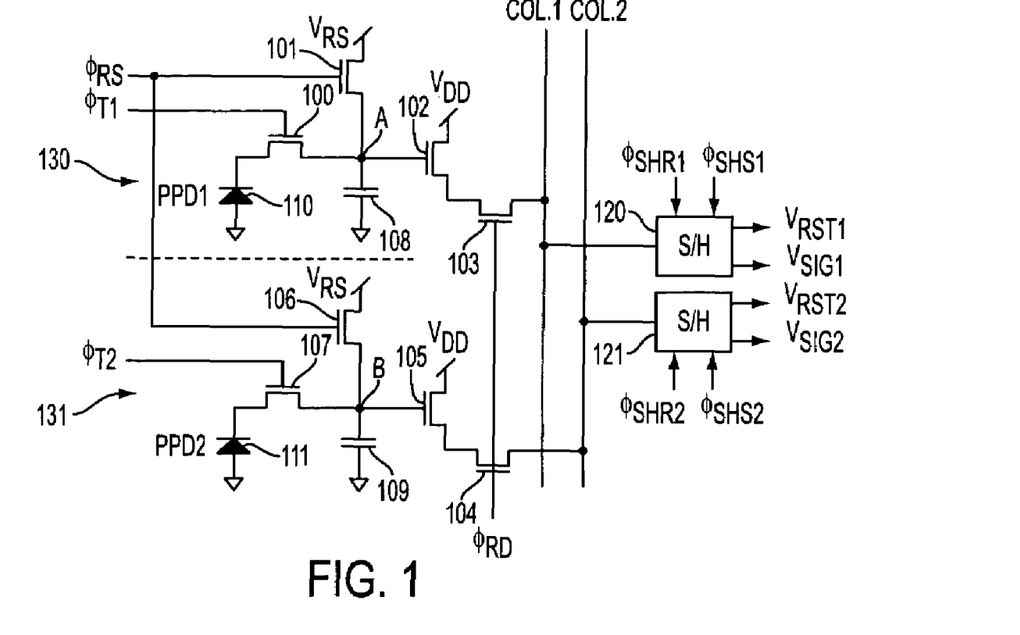
FIG. 1 is a schematic diagram of a first embodiment of a pixel in accordance with the invention.

FIG. 1 illustrates a first embodiment of the present invention, wherein the circuit comprises an upper pixel circuit 130 and a lower pixel circuit 131. The upper pixel circuit is defined by pinned photodiode PPD1 (110), transfer transistor 100, floating diffusion node "A," a capacitor 108 coupled to node "A," source follower transistor 102 having a gate connected to node "A" and a row select transistor 103. The pixel circuit includes a reset transistor 101, which operates in response to a reset pulse signal $\phi_{RS}$ applied to its gate. Row select transistor 103 is further coupled to the first of two column signal lines (COL. 1) and receives a row select pulse signal $\phi_{RD}$ at its gate. Transfer transistor 100 is responsive to a transfer pulse signal $\phi_{T1}$ applied to its gate to transfer charge from the pinned photodiode 110 to diffusion node "A." The upper pixel circuit is operated to handle "normal" light conditions (i.e., from low light to medium light levels) and has high sensitivity characteristics by use of a longer integration time ($T_{INT1}$, FIG. 2). Capacitor 108 may be the parasitic capacitance of node "A" or a discrete capacitor.

Figure 2:
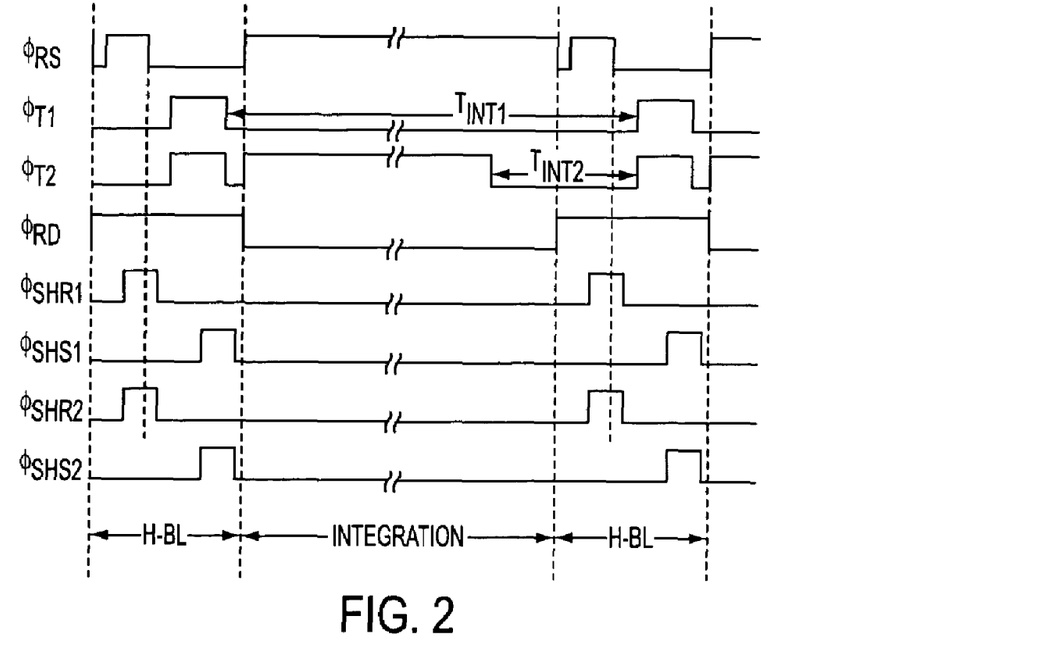
FIG. 2 is a timing diagram illustrating operation of the embodiment shown in FIG. 1.

The lower pixel circuit 131 is defined by pinned photodiode PPD2 (111), transfer transistor 107, floating diffusion node "B," capacitor 109, coupled to node "B," source follower transistor 105 having a gate connected to node "B" and a row select transistor 104. Pixel circuit 131 also includes reset transistor 106, having a gate which receives a reset pulse signal $\phi_{RS}$. Row select transistor 104 is further coupled to the second of two column signal lines (COL. 2). Transfer transistor 107 is responsive to a transfer pulse signal $\phi_{T2}$ applied to its gate to transfer charge from pinned photodiode 111 to floating diffusion node "B." The lower pixel circuit is operated to have a lower sensitivity to handle very high light levels by use of a shorter integration time $T_{INT2}$ (FIG. 2). Capacitor 109 may be the parasitic capacitance of node "B" or a discrete capacitor.

Both column lines (COL. 1, COL. 2) are output to respective sample-and-hold circuits 120, 121 for obtaining respective pairs of an integrated pixel ($V_{SIG1}$, $V_{RST1}$) for pixel circuit 130, and ($V_{SIG2}$, $V_{RST2}$) for pixel circuit 131. With the 2-column signal line configuration shown in FIG. 1, common reset $\phi_{RS}$, row select $\phi_{RD}$, sample reset signal $\phi_{SHR}$ and sample integration pixel $\phi_{SHS}$ can be used for both pixels. An exemplary timing diagram disclosing operation of the circuit of FIG. 1, is illustrated in FIG. 2. The timing diagram illustrates the relationship between signals $\phi_{RS}$, $\phi_{T1}$, $\phi_{T2}$, $\phi_{RD}$, $\phi_{SHR1}$, $\phi_{SHS1}$, $\phi_{SHR2}$, and $\phi_{SHS2}$. An integration time shown in FIG. 2 corresponds to the period between the falling edge and the rising edge of transfer pulse $\phi_T$. In the illustrated embodiment, the pixel signal integration time occurs during a frame time between horizontal blanking periods (H-BL) corresponding to a respective row.

Since signal charge accumulates on each pinned photodiode during the integration period (typically a few 10 s of a ms), and the time for the signal charge to stay on the floating diffusion is very short (a few µs during blank-out period H-BL), signal degradation due to leakage current is negligible. This is true even if the leakage current on the floating diffusion node is relatively large (assuming the leakage current of the pinned diode is sufficiently low). During the integration period, reset pulse $\phi_{RS}$ is turned ON so that the floating diffusion acts as a lateral overflow drain. When a Correlated Double Sampling (CDS) operation is used in which both reset ($V_{RST}$) and charge integration ($V_{SIG}$) signals are taken during the same image frame, little kTC noise appears with the proper pulse timing, and a very low dark current exists as a result.

Turning to FIG. 2, during the charge integration period ($T_{INT1}$ for pixel 130, and $T_{INT2}$ for pixel 131), electrons accumulate across the pinned photodiodes 110 and 111. As reset pulse signal $\phi_{RS}$ is brought high during the blanking period, it turns reset transistors 101 and 106 on and resets the floating diffusion nodes A and B in pixel circuits 130, 131 from any previous integration cycle. Thus, a potential on floating diffusion nodes A and B is set at $V_{RS}$.

After the reset signal $\phi_{RS}$ is returned to its initial low potential, the sample and hold circuitry (120, 121) briefly samples the potential of the floating diffusion nodes A and B. As can be seen from FIG. 2, $\phi_{SHR1}$ and $\phi_{SHR2}$ sample signals are pulsed concurrently.

As shown in FIG. 2, the integration period $T_{INT1}$ for pixel 130 begins first when the transfer gate signal $\phi_{T1}$ is low. During integration period $T_{INT1}$, charge is accumulated by photodiode 110. The integration period $T_{INT2}$ for pixel 131 begins after that of pixel 130 when transfer signal $\phi_{T2}$ goes low. During integration period $T_{INT2}$ charge is accumulated by photodiode 111. Then, transfer pulses $\phi_{T1}$ and $\phi_{T2}$ are turned on and the charge stored on pinned photodiodes are transferred to the floating diffusion nodes (110→A, 111→B). After the transfer pulses $\phi_{T1}$ and $\phi_{T2}$ are returned to their initial low potential, the sample and hold circuitry (120, 121) briefly samples the potential of the floating diffusion nodes A and B. As can be seen from FIG. 2, $\phi_{SHS1}$ and $\phi_{SHS2}$ sample signals are pulsed concurrently. Once the sample signals $V_{SIG1}$, $V_{SIG2}$ are obtained, the pixel circuits 130, 131 are ready to begin a charge integration period.

Figure 3:
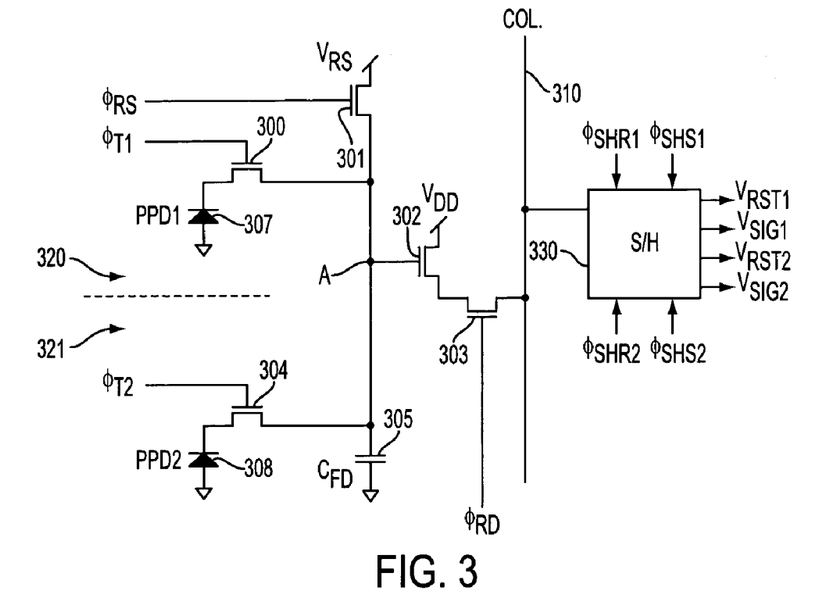
FIG. 3 is a schematic diagram of a second embodiment of a pixel circuit in accordance with the invention.

FIG. 3 illustrates a second embodiment of the present invention, wherein one column signal line (310) is being used to output the signals from two pixels 320, 321. The circuit of FIG. 3 obtains two sets of output signals ($V_{RST1}$, $V_{SIG1}$; $V_{RST2}$, $V_{SIG2}$), and the charge transfer operation for the two pixels is performed sequentially (as shown by the timing diagram in FIG. 4).

Figure 4:
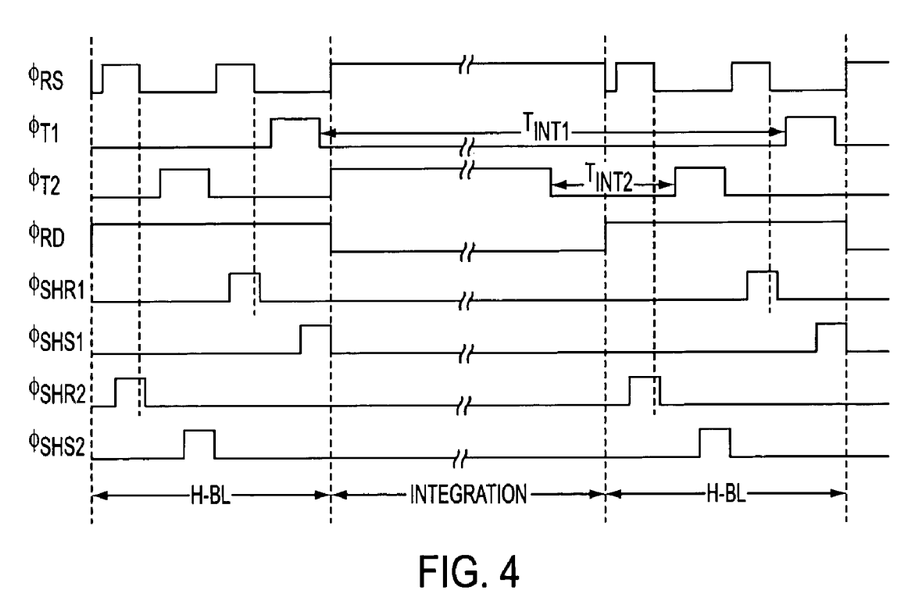
FIG. 4 is a timing diagram illustrating operation of the embodiment shown in FIG. 3.

The upper pixel circuit 320 of the pixel configuration includes a transfer transistor 300, having a source coupled to pinned photodiode PPD1 307, a drain coupled to floating diffusion node "A," a capacitor 305 having one terminal coupled to diffusion node "A" and to the drain of transfer transistor 300 and another terminal coupled to ground. An anode of pinned photodiode 307 is also coupled to ground. The gate of transfer transistor 300 receives transfer control signal $\phi_{T1}$. Reset transistor 301 is coupled to both the upper and lower pixel circuits 320, 321 at node "A", and is triggered by reset pulse signal $\phi_{RS}$. The upper pixel circuit 320 is operated to handle normal light conditions, and is set to have high sensitivity characteristics by use of a longer integration time $T_{INT1}$ (FIG. 4). Capacitor 305 may be the parasitic capacitance of node "A" or a discrete capacitor.

The lower pixel circuit 321 includes transfer transistor 304, having a source coupled to pinned photodiode PPD2 (308), and a drain coupled to floating diffusion node "A". The pinned photodiode 308 is also coupled to ground. The gate of transfer transistor 304 receives transfer control signal $\phi_{T2}$. The lower pixel circuit 321 is operated to have lower light sensitivity to handle very high light levels by use of a shorter integration time $T_{INT2}$ (FIG. 4).

The upper pixel and lower pixel circuits 320, 321 output respective reset signals ($V_{RST1}$, $V_{RST2}$) and integration signals ($V_{SIG1}$, $V_{SIG2}$) to a source follower transistor 302, which is further coupled to row select switch 303. The gate of row select switch 303 is coupled a row select pulse signal $\phi_{RD}$, and the source of switch 303 is coupled to the column signal line (COL). The column signal line outputs the signals $V_{SIG1}$, $V_{SIG2}$, as well as reset signals $V_{RST1}$, $V_{RST2}$.

An exemplary timing diagram depicting operation of the circuit in FIG. 3 is shown in FIG. 4. The sample and hold circuit 330 for the FIG. 3 embodiment operates in response to applied sample signals $\phi_{SHR1}$, $\phi_{SHS1}$, $\phi_{SHR2}$, and $\phi_{SHS2}$ to sample and hold the pixel signal $V_{RST1}$, $V_{SIG1}$, $V_{RST2}$ and $V_{SIG2}$. Similar to the timing diagram in FIG. 2, the two integration times $T_{INT1}$ (long) and $T_{INT2}$ (short) are respectively set by the transfer pulse signals $\phi_{T1}$, $\phi_{T2}$.

Starting with reset, the floating node "A" is twice reset during the horizontal blanking period (H-BL) by the two pulse signals $\phi_{RS}$, which turn on reset transistor 301. The row select signal $\phi_{RD}$ turns on row select transistor 303 during the entire blanking period. The reset voltage $V_{RST2}$ of pixel 321 is sampled by applying the $\phi_{SHR2}$ signal to sample and hold circuit 330. Then the transfer pulse for the lower pixel circuit $\phi_{T2}$ turns on and the charge stored on the pinned photodiode 308 is transferred to the node "A". When the integration period $T_{INT2}$ ends by signal $\phi_{T2}$ returning high and transferring charge to node "A," the integration charge signal $V_{SIG2}$ is sampled and held by sample and hold circuit 330 in response to sample signal $\phi_{SHS2}$. After $V_{SIG2}$ is sampled and held, the reset pulse is again turned on, thereby clearing the charge on the floating diffusion node "A". The reset voltage $V_{RST1}$ of pixel 320 is sampled by applying the $\phi_{SHR1}$ signal to sample and hold circuit 330. Then the transfer pulse for the upper pixel circuit $\phi_{T1}$ turns on and the charge stored on the pinned photodiode 307 is transferred to the node "A". When the integration period $T_{INT1}$ ends by signal $\phi_{T1}$ returning high and transferring charge to node "A," the integration charge signal $V_{SIG1}$ is sampled and held by sample and hold circuit 330 in response to sample signal $\phi_{SHS1}$. Charge integration for pixel 320 begins when transfer signal $\phi_{T1}$ goes low to begin the longer integration period $T_{INT1}$, while charge integration for pixel 321 begins when transfer signal $\phi_{T2}$ goes low sometime in the frame time to begin the shorter integration period $T_{INT2}$. Thus, a single column line (COL) and sample and hold circuit 330 can be used for the two pixel circuits 320, 321 to provide the pixel signals $V_{RST1}$, $V_{SIG1}$, and $V_{RST2}$, $V_{SIG2}$.

Figure 5:
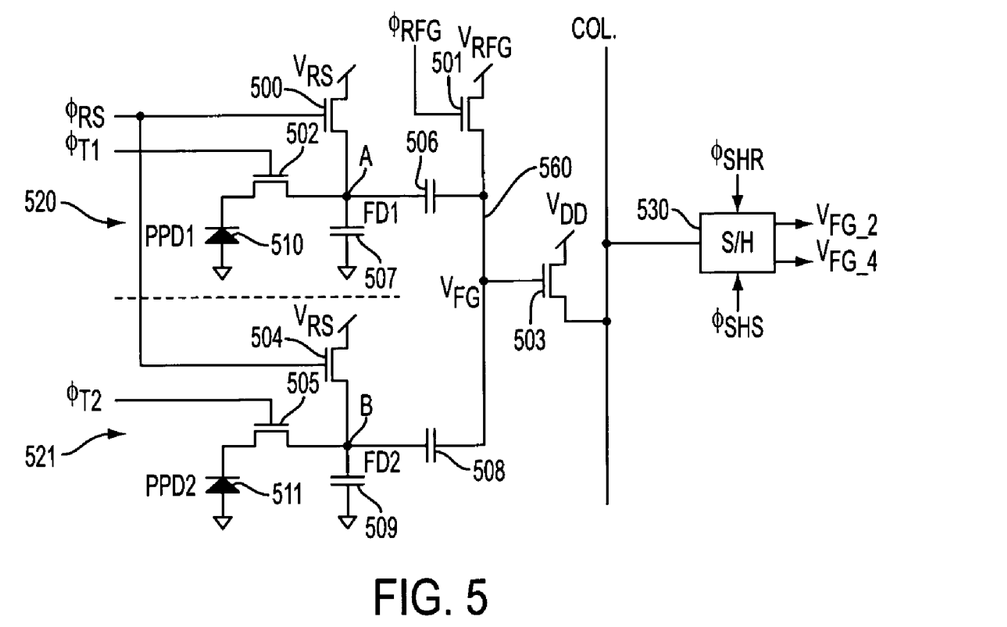
FIG. 5 is a schematic diagram of a third embodiment of a pixel circuit in accordance with the invention.

A third embodiment of the present invention is illustrated in FIG. 5, where the circuit comprises an upper and lower pixel circuits 520, 521, with the upper pixel circuit 520 including pinned photodiode PPD1 (510), transfer transistor 502, coupled between the photodiode 510 and floating diffusion node FD1, and the capacitor 507 having one terminal connected to floating diffusion node FD1 and another terminal coupled to ground, reset transistor 500 coupled between a reset voltage $V_{RS}$ and node FD1, and capacitor 506 having one terminal coupled to capacitor 507 and the terminal coupled to a floating gate line 560 shared with lower pixel circuit 521. The reset transistor 500 receives a reset control signal $\phi_{RS}$ at its gate. The upper pixel circuit 520 provides an output on line 560 coupled to transistor 501 which has one side connected to voltage $V_{RFG}$ and another side connected to common floating gate line 560. The gate of transistor 501 receives a control signal $\phi_{RFG}$.

The lower pixel circuit includes pinned photodiode PPD2 (511), transfer transistor 505, coupled between the photodiode 511 and floating diffusion node FD2, a capacitor 509 having one terminal connected to node FD2 and another terminal connected to ground, reset transistor 504 coupled between a reset voltage $V_{RS}$ and node FD2, a capacitor 508 having one terminal connected to node FD2 and another terminal connected to floating gate line 560. Reset transistor 504 also has a gate connected to reset control signal $\phi_{RS}$. Transfer transistors 502 and 505 are respectively controlled by transfer control signals $\phi_{T1}$ and $\phi_{T2}$.

In the third embodiment, the two pinned photodiodes (510, 511) accumulate signal charge during the integration times $T_{INT1}$ and $T_{INT2}$ respectively. Then, during the horizontal blanking period (H-BL), the accumulated charges at the photodiodes 510, 511 are transferred to the floating diffusion nodes ("FD1", "FD2") respectively, wherein the signal voltages are added at the gate of transistor 503 (node $V_{FG}$) and sampled and held by sample signal $\phi_{SHS}$. The diffusion regions FD1 and FD2 are reset by respective reset transistors 500 and 504, which have their gates commonly connected to receive reset control signal $\phi_{RS}$. The reset signals from the two pixels are combined at the gate of the transistor 503 and sampled and held by sample signal $\phi_{SHR}$. Voltages at the $V_{FG}$ node and FD1 and FD2 nodes are summarized in Table 1, shown below. The table shows the on/off states of the timing signals of FIG. 6, and five different operational states denoted by signal subscripts 0, 1, 2, 3, 4 for pixel circuits 520 (i=1) and 521 (i=2).

TABLE 1

Figure 6:
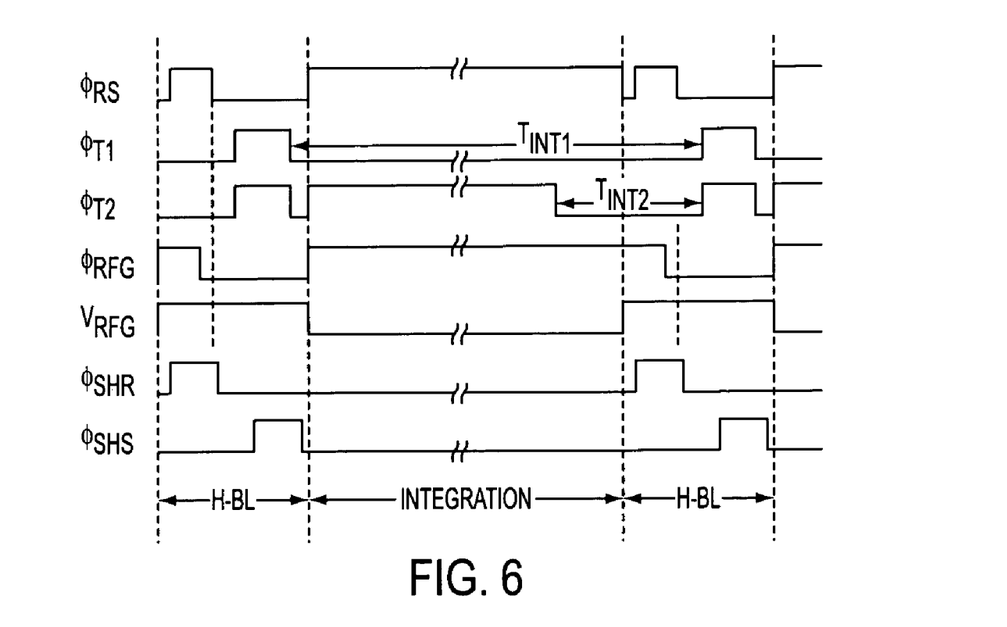
FIG. 6 is a timing diagram illustrating operation of the FIG. 5 embodiment.

$V_{FG}$ and $V_{FD,i}$ (i = 1, 2)

| Timing | | $V_{FG}$ | $V_{FD,i}$ |
|---|---|---|---|
| $\phi_{RS}$ = ON | $\phi_{RFG}$ = ON | $V_{FG\_0} = V_{RFG}$ | $V_{FD,1\_0} = V_{RS}$ |
| $\phi_{RS}$ = ON | $\phi_{RFG}$ = OFF | $V_{FG\_1} = V_{RFG} + v_{kTC,FG}$ | $V_{FD,1\_1} = V_{RS}$ |
| $\phi_{RS}$ = OFF | $\phi_{RFG}$ = OFF | $V_{FG\_2} = V_{FG1} + \alpha \cdot (v_{kTC,FD1}) + \beta \cdot (v_{kTC,FD2})$ | $V_{FD,i\_2} = V_{RS} + v_{kTC,FD,1}$ |
| $\phi_{T1}$ = ON | $\phi_{T2}$ = ON | $V_{FD\_3} = V_{FD\_2} + \alpha \cdot V_{sig,1} + \beta \cdot V_{sig2}$ | $V_{FD,1\_3} = V_{FD,1\_2} + V_{sig,1}$ |
| $\phi_{T1}$ = OFF | $\phi_{T2}$ = OFF | $V_{FG\_4} = V_{FG\_3}$ | $V_{FD,1\_4} = V_{FD,1\_3}$ |

During a first operational state (phase 0), the floating diffusion nodes FD1 and FD2 are reset at $V_{RS}$, while the floating gate line is reset at $V_{RFG}$. During a second operational state (phase 1) the pulse $\phi_{RFG}$ is turned off, and the kTC noise, $v_{kTC,FG}$, appears on the floating gate line. During a third operational state (phase 2), the reset pulse $\phi_{RS}$ is turned off, and the kTC noise, $v_{kTC,FD,1}$, appears on the floating diffusion nodes FD1 and FD2. At this moment, these kTC noise voltages, $v_{kTC,FD,1}$ and $v_{kTC,FD,2}$, affect the floating gate line potential through coupling capacitors 506 and 508, and the resulting floating gate potential is shown in the third row of Table 1. This floating gate potential is sampled and held by pulsing the reset sampling pulse $\phi_{SHR}$.

During a fourth operational state (phase 3), transfer pulses $\phi_{T1}$ and $\phi_{T2}$ are turned on and the signal charge stored on the photodiodes are transferred to the floating diffusion nodes (510→FD1, 511→FD2). As a result, the floating diffusion potential becomes $V_{FD,i\_3}=V_{FD,i\_2}+V_{sig,i}$. These potentials again affect the floating gate potential through coupling capacitors 506 and 508, and the resulting floating gate potential is shown in the fourth row of Table 1. This floating gate potential is sampled and held by pulsing the signal sampling pulse $\phi_{SHS}$.

During a fifth operational state (phase 4), no change occurs from the state in phase 3. During the integration period, $\phi_{RS}$ is preferably set at high so that the floating diffusion nodes act as lateral overflow drains. Also, the pulse $\phi_{RFG}$ is set high with $V_{RFG}$ being set below the threshold voltage of the source follower transistor 503, so that a row select transistor, which is used in the 1$^{st}$ and 2$^{nd}$ embodiments, can be eliminated.

The sample-and-hold pulses ($\phi_{SHR}$ and $\phi_{SHS}$) sample the reset level (corresponds to $V_{FG\_2}$) and the signal level (corresponds to $V_{FG\_3}$ or $V_{FG\_4}$), respectively. The output voltage of the CDS circuit is given by:

$$V_{OUT\_CDS} \propto (V_{FG\_4} - V_{FG\_2}) = \alpha \cdot V_{sig1} + \beta \cdot V_{sig2} \quad (1)$$

which calculates a weighted-sum operation, and where α and β are characterized by:

$$\alpha = \frac{C_{C1}}{C_{C1} + C_{C2} + C_G} \quad (2)$$

$$\beta = \frac{C_{C2}}{C_{C1} + C_{C2} + C_G} \quad (3)$$

where capacitors $C_{C1}$ and $C_{C2}$ are illustrated as capacitors 506 and 508, respectively and $C_G$ is the parasitic capacitance between the floating gate (i.e., the node at which $V_{FG}$ accumulates) and the substrate.

$V_{sig1}$ and $V_{sig2}$ are given by:

$$V_{sig,1} = \frac{q \cdot N_{sig,1}}{C_{FD,1}} \quad (4)$$

Where i=(1,2) for pixel circuit 520 and 521 respectively, $C_{FD,1}$ represent the capacitance of capacitors 507 or 509, and $N_{sig,1}$ represents the signal electrons accumulated on the pinned photodiode 510 or 511.

As is shown in Table 1, by employing proper timing, a correlated double sampling (CDS) sample and hold circuit 530 on a column line eliminates the kTC noise from transistors 500, 504 and 501. In order to obtain the same saturation voltage, the photodiode size and the floating diffusion size can be set as $$\frac{A_{PPD1}}{C_{FD1}} = \frac{A_{PPD2}}{C_{FD2}} \quad (5)$$

where $C_{FD1}$ and $C_{FD2}$ represent the capacitance of the floating diffusion 510 and 511 and $A_{PPD1}$ and $A_{PPD2}$ are the light sensitive area of the photodiodes 510 and 511.

Figure 7:
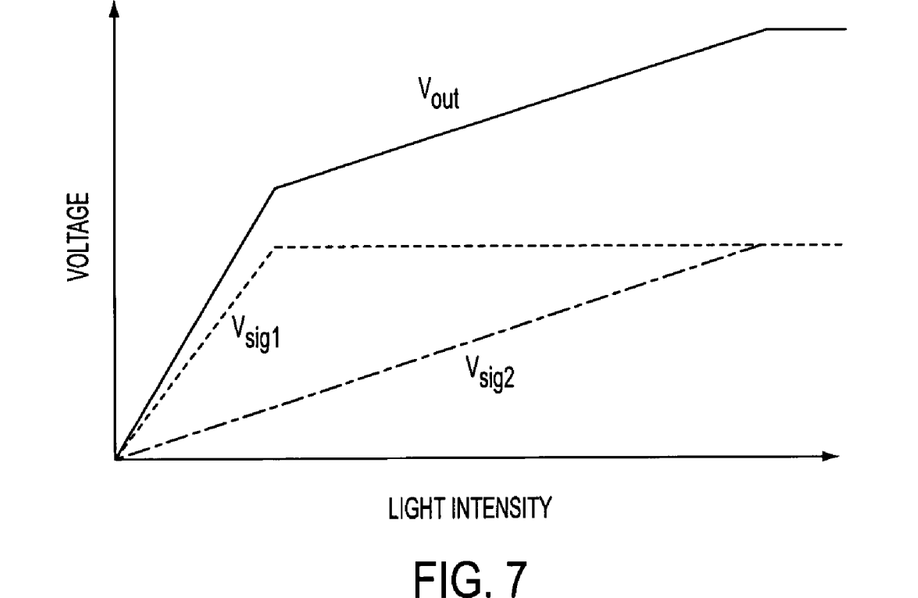
FIG. 7 is a graph illustrating an example of signal transfer characteristics according with the present invention.

For example, assuming that $C_{FD1}/C_{FD2}$=4, $A_{PPD1}/A_{PPD2}$=4) $T_{INT1}$=16 ms and $T_{INT2}$=160 μs (see FIG. 6), the ratio of sensitivities will be 100 (+40 dB). An example of the output transfer characteristic of the FIG. 5 embodiment is illustrated in FIG. 7. When the relationship of equation (5) holds, the graph in FIG. 7 discloses the correlation among signals $V_{out}$, $V_{sig1}$ and $V_{sig2}$, as described above. Since the floating gate node 560 can be set at a voltage below the threshold of the source follower transistor 503 during the integration period, a row select transistor can be removed from the circuitry (FIG. 5). In the first and second embodiments, two sets of output images for a pixel are obtained for the two pixel pairs. In the embodiment in FIGS. 5-6, one output signal set $V_{FG\_4}$, $V_{FG\_2}$ is obtained having reset components of both pixels ($V_{FG\_2}$) and pixel signal component of both pixels ($V_{FG\_4}$) with linearly kneed characteristics (FIG. 7).

Figure 8:
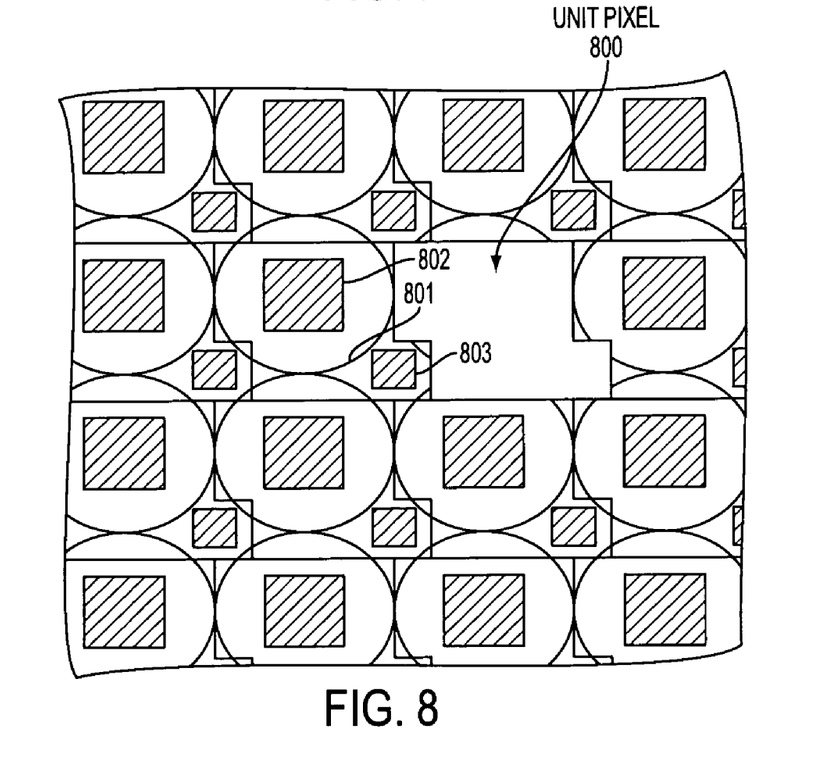
FIG. 8 is an example of pixel and on-chip microlens placement.

When an on-chip microlens array as shown in FIG. 8 is used, it is possible to further increase the dynamic range of an imager containing pixels constructed in accordance with the invention. FIG. 8 provides an example of an on-chip microlens placement. Under the configuration shown, most of the incident light passing through the lens (801) array of a unit pixeL; 800 is focused onto PPD1 802, the photodiode having the longer integration time in each of the embodiments described above, while the remaining incident light is unfocused and passed to photodiode PPD2 803, having the shorter integration time. The increased effective area of PPD1 ($A_{PPD1}$) would further extend the dynamic range.

Figure 9:
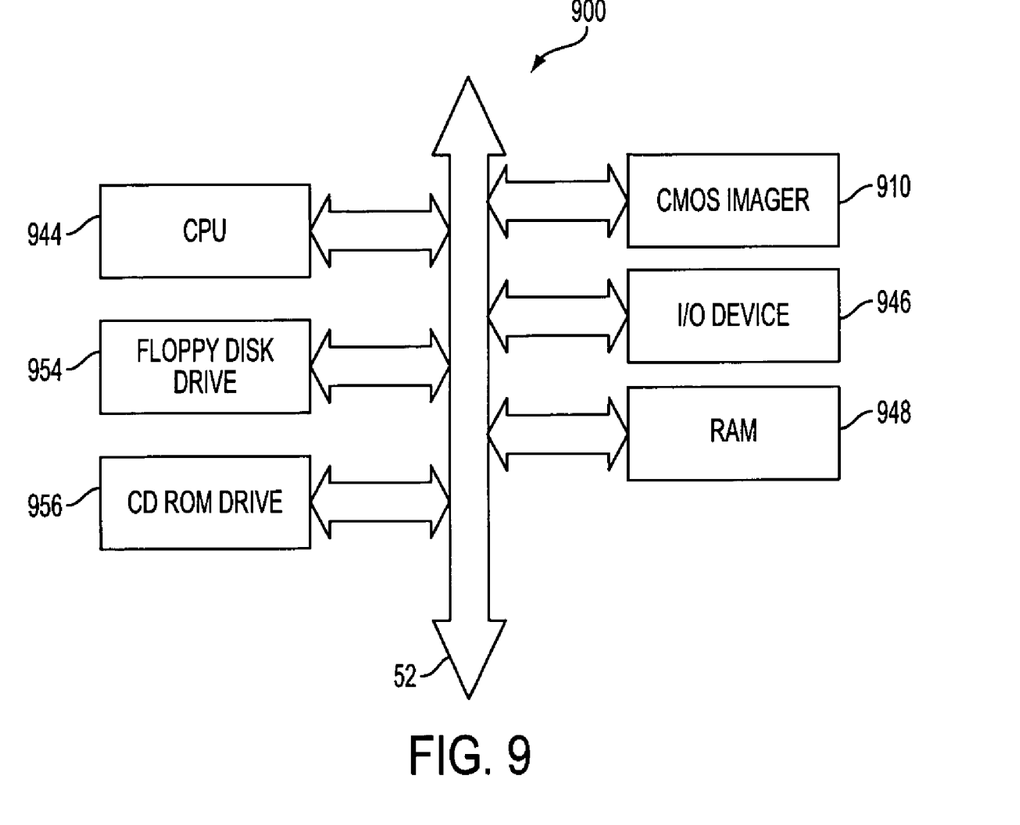
FIG. 9 is a diagram illustrating a computer system which may implement embodiments of the disclosure.

A typical processor based system that includes a CMOS imager device according to the present invention is illustrated generally in FIG. 9. A processor based system is exemplary of a system having digital circuits that coould include CMOS imager devices. Without being limiting, such a system could include a computer system, camera system, scanner, machine vision system, vehicle navigation system, video telephone, surveillance system, auto focus system, star tracker system, motion detection system, image stabilization system and data compression system for high-definition television, all of which can utilize the present invention.

A processor system, such as a computer system, for example generally comprises a central processing unit (CPU) 944 that communicates with an input/output (I/O) device 946 over a bus 952. The CMOS imager 910 also communicates with the system over bus 952. The computer system 900 also includes random access memory (RAM) 948, and, in the case of a computer system may include peripheral devices such as a floppy disk drive 954 and a compact disk (CD) ROM drive 956 which also communicate with CPU 944 over the bus 952. As described above, CMOS imager 910 is combined with a pipelined JPEG compression module in a single integrated circuit.

As can be seen in the embodiments described herein, the present invention encompasses a unique two pixel structure that employs pinned photodiodes to provide extended dynamic ranges for imaging circuits. By using dual sensitivity and dual integration time techniques in the circuitry along with the pinned photodiodes, the dynamic range can effectively be extended without experiencing excessive noise. Accordingly, image sensors employing this circuit and method can detect a wider range of illuminations and consequently produce images of greater detail and quality.

It should again be noted that although the invention has been described with specific reference to CMOS imaging devices, the invention has broader applicability and may be used in any imaging apparatus. The above description and drawings illustrate preferred embodiments of the present invention. It is not intended that the present invention be limited to the illustrated embodiments. Any modification of the present invention that comes within the spirit and scope of the following claims should be considered part of the present invention.

What is claimed as new and desired to be protected by Letters Patent of the United States is:

1. An image apparatus, comprising:
a first linear pixel circuit for producing a first pixel output signal of a first pixel cell based on charge integration by a first photo-conversion device over a first integration period, and
a second linear pixel circuit for producing a second pixel output signal of said first pixel cell based on charge integration by a second photo-conversion device over a second integration period, wherein the second integration period is shorter than the first integration period, and said first pixel cell is structurally configured such that said second photo-conversion device receives less light than said first photo-conversion device; and
a sample-and-hold circuit for capturing signals representing said first and second pixel output signals.

2. An apparatus as in claim 1, further comprising a column line commonly connected to receive said signal representing said first and second pixel output signals.

3. An apparatus as in claim 2, wherein said sample-and-hold circuit is coupled to said common column line and sequentially captures said signals representing said first and second pixel output signals.

4. An image apparatus as in claim 1, wherein said first photo-conversion device is configured to integrate light received by a first light-receiving region over said first integration period, said second photo-conversion device is configured to integrate light received by a second light-receiving region over said second integration period, and said second light receiving region is smaller than said first light-receiving region.

5. An image apparatus as in claim 4, further comprising:
a microlens array comprising said first and second light-receiving regions.

6. An image apparatus as in claim 4, wherein said second photo-conversion device comprises said second light receiving-region and said first photo-conversion device comprises said first light-receiving region.

7. An image apparatus as in claim 1, wherein said first and second photo-conversion devices are adjacent photo-conversion devices of a photo-conversion device array.

8. An image apparatus as in claim 1, wherein said first and second integration periods are fixed in duration.

9. The image apparatus as in claim 1, wherein said first pixel output signal and said second pixel output signal are each output to the same column line output.

10. An imaging apparatus, comprising:
a first pixel circuit of a first pixel cell, said first pixel circuit configured to generate a first pixel output signal and comprising a first transfer pulse line coupled to a gate of a first transfer transistor, wherein the first transfer transistor transfers charge from a first photodiode to a floating diffusion node, and wherein said floating diffusion node is further coupled to a reset transistor and a gate of a source-follower transistor;
a second pixel circuit of said first pixel cell, said second pixel circuit configured to generate a second pixel output signal and comprising a second transfer pulse line, coupled to a gate of a second transfer transistor, wherein the second transfer transistor transfers integrated charge from a second photodiode and to the floating diffusion node, said second photodiode structurally configured to receive less light than said first photodiode;
a reset pulse line, connected to the gate of the reset transistor, wherein the reset transistor is coupled to reset the floating diffusion node to a predetermined voltage state; and
a row-select transistor, respectively coupled to the source-follower transistors for respectively coupling said first and second pixel circuits to a column signal line, said first transfer pulse line receiving a signal which operates said first photodiode to integrate charge for a first time period and said second transfer pulse line receiving a signal which operates said second photodiode to integrate charge for a second time period different from said first time period.

11. The apparatus according to claim 10, wherein the first and second photodiodes are pinned photodiodes.

12. The apparatus according to claim 11, wherein the pinned photodiodes are coupled to ground.

13. The apparatus according to claim 10, further comprising a capacitor coupled to the floating diffusion node.

14. The apparatus according to claim 13, wherein the capacitor is further coupled to ground.

15. An imaging apparatus as in claim 10, wherein said first photodiode is configured to integrate light received by a first light-receiving region over said first time period, said second photodiode is configured to integrate light received by a second light-receiving region over said second time period, and said second light-receiving region is smaller than said first light-receiving region.

16. An imaging apparatus as in claim 15, further comprising:
a microlens array comprising said first and second light-receiving regions.

17. An imaging apparatus as in claim 15, wherein said second photodiode comprises said second light-receiving region and said first photodiode comprises said first light-receiving region.

18. An imaging apparatus as in claim 10, wherein said first and second photodiodes are adjacent photodiodes of a photodiode array.

19. An imaging apparatus as in claim 10, wherein said first and second integration periods are fixed in duration.

* * * * *